United States Patent [19]

Willis et al.

[11] 4,383,441
[45] May 17, 1983

[54] METHOD FOR GENERATING A TABLE OF ENGINE CALIBRATION CONTROL VALUES

[75] Inventors: Frederick G. Willis, Ann Arbor; Richard R. Radtke, Plymouth; Joseph Ellison, Detroit; Steven R. Fozo, Westland; Glenn A. Kern, Ann Arbor, all of Mich.

[73] Assignee: Ford Motor Company, Dearborn, Mich.

[21] Appl. No.: 284,891

[22] Filed: Jul. 20, 1981

[51] Int. Cl.³ ............................................ G01M 15/00
[52] U.S. Cl. .................................... 73/117.3; 364/551
[58] Field of Search ............... 73/116, 117.3; 364/551, 364/431.1, 431.3, 431.4; 123/417

[56] References Cited

U.S. PATENT DOCUMENTS

| | | | |
|---|---|---|---|
| 3,816,717 | 6/1974 | Yoshida et al. | 235/150.21 |
| 3,835,819 | 9/1974 | Anderson, Jr. | |
| 3,846,760 | 11/1974 | Ironside | 340/172.5 |
| 3,862,404 | 1/1975 | Fiedrich | 235/152 |
| 3,888,220 | 6/1975 | Bigalke et al. | 123/117 R |
| 3,906,205 | 9/1975 | Yoshida et al. | 235/150.21 |
| 3,916,170 | 10/1975 | Norimatsu et al. | 235/150.21 |
| 3,969,614 | 7/1976 | Moyer et al. | 235/150.21 |
| 4,026,251 | 5/1977 | Schweitzer et al. | |
| 4,038,526 | 7/1977 | Eccles et al. | 235/150.1 |
| 4,086,884 | 5/1978 | Moon et al. | |
| 4,098,243 | 7/1978 | Yoshida et al. | 123/117 D |
| 4,099,495 | 7/1978 | Kiencke | |
| 4,231,091 | 10/1980 | Motz | 364/431.04 |

Primary Examiner—Jerry W. Myracle
Attorney, Agent, or Firm—Peter Abolins; Clifford L. Sadler

[57] ABSTRACT

This specification discloses a method for generating a table of engine calibration control values for an adaptive spark and EGR control strategy. The adaptive strategy adjusts spark timing and magnitude of EGR as a function of engine energy usage per distance traveled while maintaining feedgas emissions at a constant level over a wide variety of driving patterns including urban, suburban and highway. This adaptive strategy has advantageous fuel consumption characteristics which are greatest at the most constrained feedgas levels. Drivability can be enhanced because of the greater calibration flexibility inherent to the adaptive technique.

12 Claims, 8 Drawing Figures

FIG. 1

METHOD FOR GENERATING A TABLE OF ENGINE CALIBRATION CONTROL VALUES

BACKGROUND OF THE INVENTION

1. Field of the Invention

This invention relates to calibration of vehicle internal combustion engines.

2. Prior Art

Conventional engine calibration includes a table of values for spark angle and exhaust gas recirculation (EGR) fraction. For example, in a computer controlled engine, such as that disclosed in U.S. Pat. No. 3,969,614 issued to Moyer et al and assigned to the assignee hereof, the disclosure of which is hereby incorporated by reference, the computer controls the engine by selecting values from these tables based on measurements of instantaneous engine revolutions per minute (RPM) and manifold absolute pressure (MAP). The tables are developed by a calibration engineer to satisfy the combined requirements of (1) meeting government standard emission requirements, (2) maximizing fuel mileage over city and highway driving, (3) achieving a desirable driveability and (4) minimizing system cost including catalyst size and loading. In making the compromises among feedgas emissions levels, mileage, and catalyst size, as indicated by the system inputs of engine RPM and manifold pressure, it is not generally possible to operate the engine at its most efficient calibration. This results in a loss of fuel mileage from the ideal. These are some of the problems this invention overcomes.

SUMMARY OF THE INVENTION

A method in accordance with an embodiment of this invention, generates tables of engine operating control values which, in addition to the conventional inputs of RPM and MAP for engine control value selection, also use energy density representing energy output per distance traveled. The method generates a table of spark advance and percent EGR for use by an adaptive vehicle engine control system.

A first step includes generating a plurality of vehicle driving cycle segments relating vehicle speed with time. A second step includes associating vehicle speed versus time coordinates of a vehicle driving cycle segment with corresponding points of a discrete matrix of engine load versus engine speed thus describing engine operation during a driving cycle segment. Further steps include selecting a target emission value and determining for each vehicle driving cycle segment, at each point of the discrete engine matrix, an optimal calibration of engine control variables including percent EGR and spark advance so that fuel economy is maximized at the selected target emission value. A still further step includes calculating for each vehicle driving segment one energy density representative of energy output divided by distance traveled during the vehicle driving segment. Still further, a step includes correlating the calibration for each point on the discrete engine matrix of a driving cycle segment with the energy density of the driving cycle segment. The method also includes eliminating all but one of the optimal calibrations of engine control variables associated with a point of the discrete engine matrix to obtain a suggested or "tag" group of engine control variables to be used with the associated energy density. This suggested or tag group of engine control variables can be considered to be a point on a three dimensional matrix having axes of energy density, engine torque and engine speed.

BRIEF DESCRIPTION OF THE DRAWINGS

FIGS. 1a, 1b and 1c each show a pair of graphs relating vehicle velocity versus time (on the left) and the engine speed versus engine load (on the right) for an energy output per mile having a high value, a middle value, and a low value, respectively.

DETAILED DESCRIPTION OF THE INVENTION

A. Overview

Figure 2:
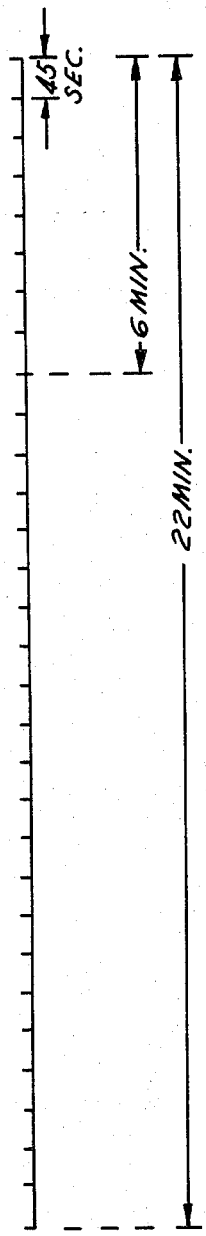
FIG. 2 is a graphical representation of the three energy density time averages maintained in accordance with an embodiment of this invention to provide a prediction for future energy density output, the averages being used in the three equations with weighting coefficients depending upon the consistency of previous driving.

The adaptive strategy in accordance with an embodiment of this invention selects engine control values for spark and EGR from look-up tables, in the same manner as the conventional calibration, but uses another variable in addition to RPM and manifold absolute pressure, MAP, when indexing these tables. This invention recognizes that engine energy output per distance traveled (i.e. energy density in units of output work per mile) is useful as another variable when selecting control values.

It is known that spark advance and EGR values for a vehicle calibration can be chosen based primarily on the amounts of time the engine spends at various speeds and torques in a given driving cycle. Engine output work per distance traveled can be related to this time distribution in the speed/load plane.

The following equations illustrate the logic that can lead one to conclude that energy/mile can be considered as equivalent to the force exerted on the vehicle by the engine:

$$\frac{\text{ENERGY}}{\text{MILE}} = \frac{(\text{POWER})(\text{TIME})}{\text{MILE}} = \frac{(\text{HP}-\text{HR})}{\text{MILE}} =$$

$$\frac{(\text{TORQUE})(\text{ENGINE SPEED})(\text{TIME})}{\text{MILE}} \text{ or, more generally,}$$

$$\frac{(\text{FORCE})(\text{DISTANCE})\left(\frac{1}{\text{TIME}}\right)(\text{TIME})}{\text{DISTANCE}} = \text{FORCE}$$

Figure 1:
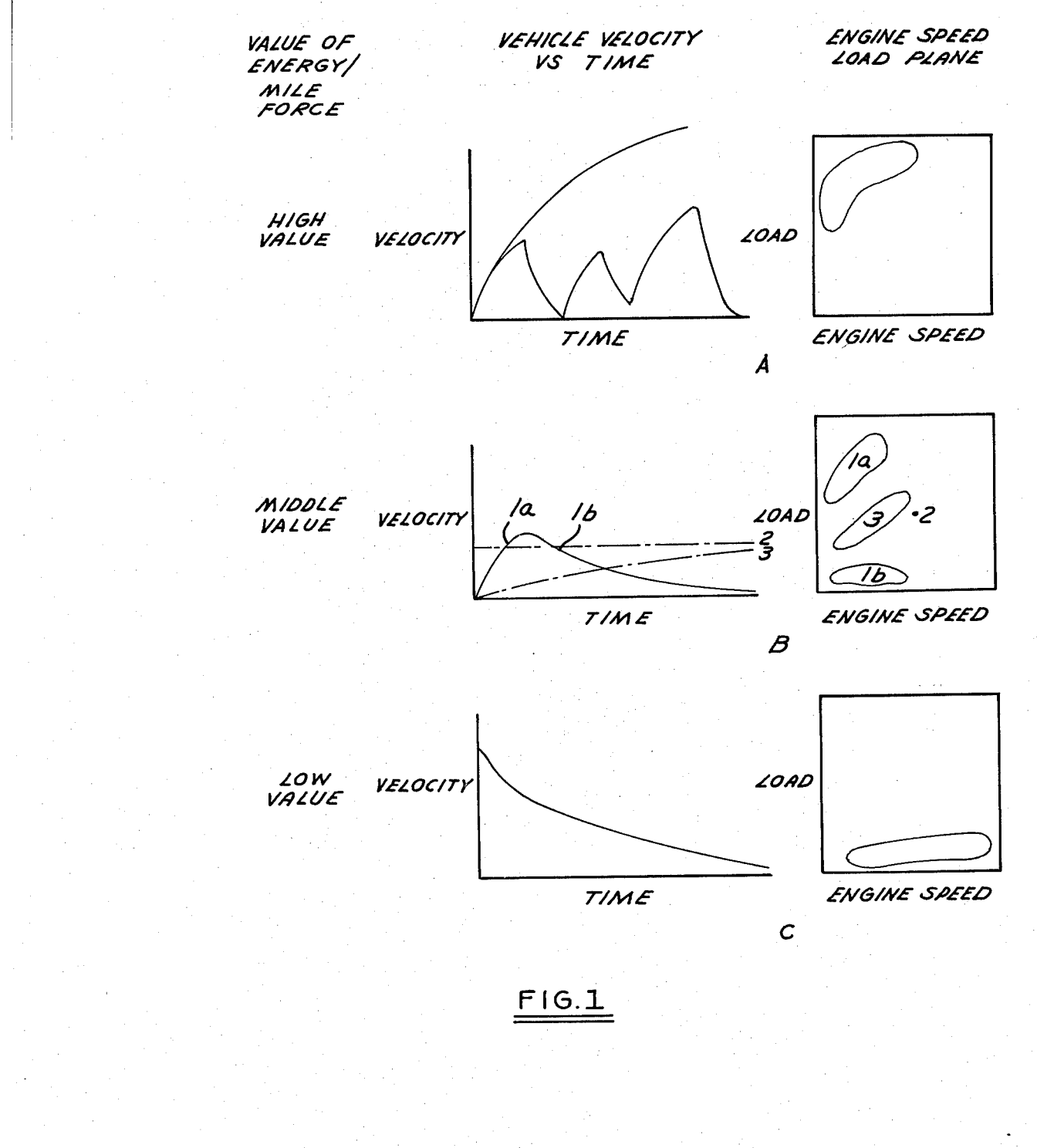

After this conclusion is reached, it is possible to propose a number of vehicle trajectories which can be associated with a given force. Examples of such trajectories are illustrated in FIG. 1 for high (FIG. 1A), middle (FIG. 1B) and low values (FIG. 1C) of force or energy densities. Because only the engine force is considered, braked decelerations do not contribute a negative force to the computation which produces the same magnitude as that occurring during a coast-down from the given speed. Therefore, the trajectory illustrating rapid acceleration and braked deceleration would have a large positive value of force or energy density. Examples of possible distributions of points in the speed/load plane associated with these trajectories are also illustrated in the right hand portion of FIG. 1.

By examining the possible trajectories illustrated in FIG. 1B for the middle values of energy densities, another relation has been uncovered. Point 2 represents operation at a steady road speed for an entire time interval, resulting in a given value of energy per mile. This same average value of energy density over a time interval could result from operation at several points in the speed/load plane; for example, spending some time in area 1a and the rest in area 1b. Continuous operation in area 1a of the speed/load plane would result in a higher energy density than at point 2, and continuous operation in area 1b would result in lower energy density. Assuming a change in velocity, the time in any area at the speed/load plane cannot be considered as being independent of the time at all other points, and this interrelationship among the times in these areas should become stronger as the areas in question are located further away from the steady state area. This is true because there are fewer alternatives, when allocating the remaining time, that would result in the correct energy level.

A driving cycle can be considered as a combination of these different trajectories in the speed/load plane. This in turn defines the time distributions for which calibrations are optimized. In general, urban driving results in high values of energy output per mile because of time spent at idle and in accelerations. Suburban driving tends to have time spent at many points in the speed/load plane because of a balance of short cruises and infrequent stops per mile. Energy density for suburban driving is typically lower than urban but higher than results from steady highway cruise. Numerous driving cycles, including suburban, city and highway, were used for development of this adaptive strategy. The adaptive strategy uses a calculated value of over-all cycle energy per mile as the basis for selecting spark and EGR values for engine control.

In addition to generating tables of engine calibration control values, the adaptive strategy involves developing an estimator technique to make judgments about over-all cycle energy per mile as the car is being driven.

The adaptive strategy attempts to hold feedgas emissions at a constant level over a driving cycle despite the fact that the near future driving pattern is not known. It makes an estimate of the over-all cycle energy output per mile based on an estimation of the recent past history of driving. For example, if the vehicle has been operating in a suburban driving mode for several minutes, the strategy will calculate a moderate value for cycle energy output per mile. If the driver enters an urban area, the instantaneous energy output per mile will immediately increase, and the strategy's estimator algorithm will calculate a new over-all value by factoring this increased energy output per mile in with the previous lower values.

The estimator chosen makes this judgment based on a weighted analysis of the recent past driving pattern (FIG. 2). The estimate is updated every 45 seconds, and the weights assigned to near, medium, and long term driving history change according to how rapidly the energy per mile of the driving cycle is changing. Engine work is estimated by calculating torque as a function of MAP, RPM, and spark advance. Averages are maintained in the computer for the previous 22 minutes, 6 minutes, and the most recent 45 seconds.

If the energy output per mile is changing rapidly, the over-all cycle estimate calculated is weighted to include only the long term, 22 minute average to maintain stability in the controller. A consistent driving pattern is first recognized when the last two calculated values of energy output per mile differ by less than 25%. The estimator then weights the near term, 45 second average and the medium term, 6 minute average more heavily in order to adapt to the new conditions. Further consistent driving results in a small shift in the weights since the six minute average now reflects the consistent pattern.

Figure 5:
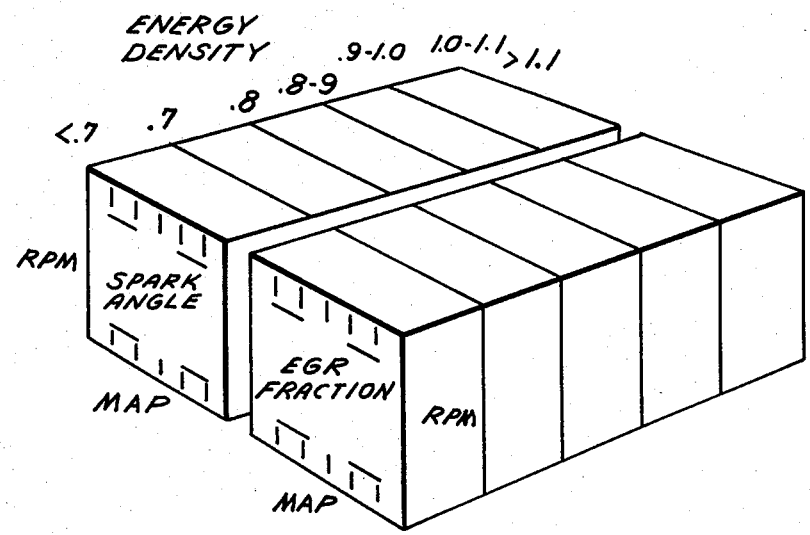
FIG. 5 is a schematic representation of a table of engine operating control values generated in accordance with an embodiment of this invention and the relationship of the table values to an electronic engine control.
Figure 5:
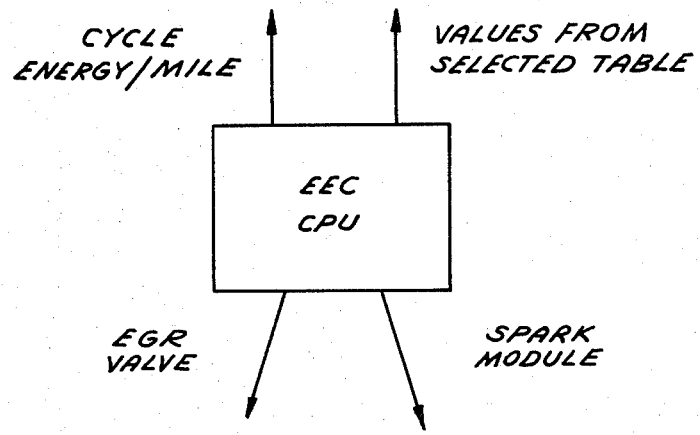

In operation, every 45 seconds a computer following the adaptive strategy calculates a new estimate of the cycle energy output per mile, and selects from a set of six the tables which correspond to that energy level (FIG. 5). Each set of tables represents a type of driving and is chosen to give target feedgas emissions in that type of driving. In this manner, the strategy attempts to maintain constant feedgas emission levels under a wide variety of driving conditions.

B. Generation of Table of Engine Calibration Control Values

Figure 6:
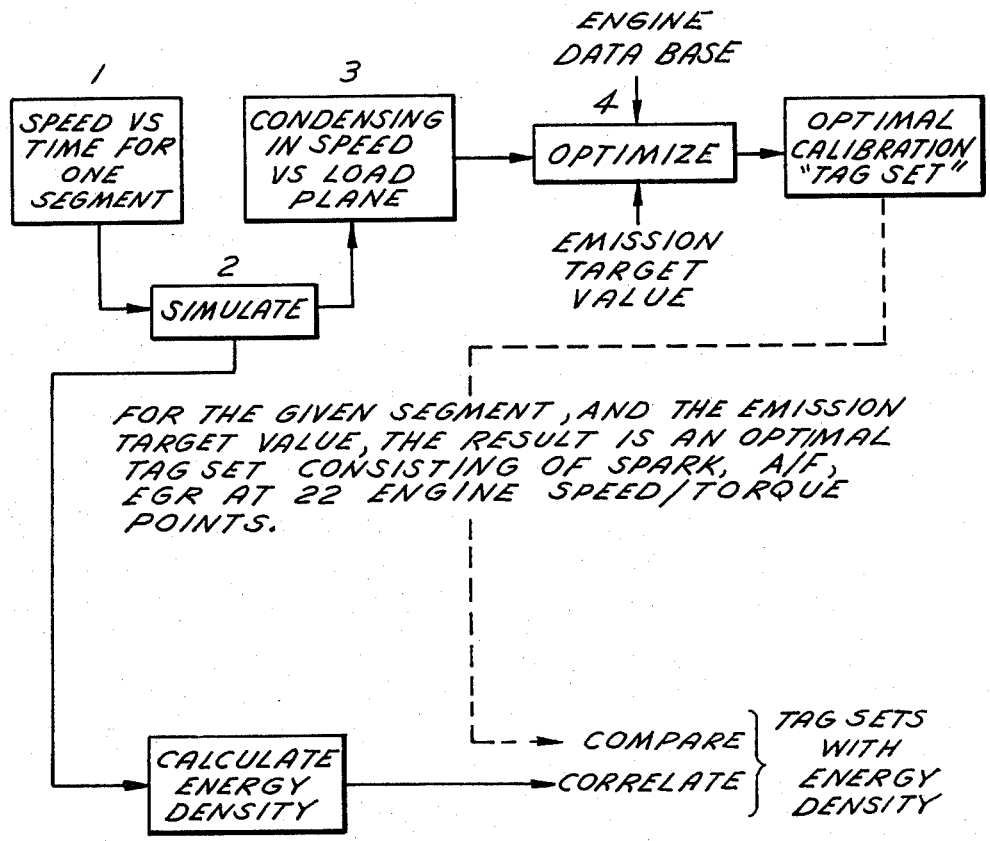
FIG. 6 is a logic block diagram of the generation of a table of engine operating control values in accordance with an embodiment of this invention.

Engine calibration is shown generally in FIG. 6 and includes the following steps:

1. Selection of characteristic driving cycles which are representative of the full range of expected driving conditions as represented by velocity versus time. For purposes of table generation, the driving cycles are split in segments of about 45 seconds in duration.

2. Calculation of a second by second engine speed versus engine torque for the duration of a segment. This can be accomplished by a simulation of vehicle operating characteristics.

3. Condensation of the second by second points to approximately 22 engine speed versus engine torque points thereby reducing the volume of information and facilitating computation.

4. Establishing a given emission constraint and determining an optimum calibration for the particular driving cycle segment including engine calibration control values termed a "tag" set. For each given driving cycle segment at a given emission constraint, the result is an optimal tag set including degrees of spark advance, air/fuel ratio, fraction of exhaust gas recirculation at each of 22 points representing engine speed versus engine torque.

5. Calculation of the energy density for the driving cycle segment.

6. Correlating the engine calibration control values with the energy density for the driving cycle segment.

7. Using drivability requirements to establish suggested magnitudes for engine calibration control variables for each energy density.

8. Developing an engine calibration control value table for a particular vehicle by reducing differences in magnitude between adjacent tag sets as needed to improve driveability.

9. Combining the vehicle calibrations with an estimator function predicting energy density in a vehicle simulation to get predicted fuel economy and emissions levels.

10. Adjustment of the values of the tag sets to improve the results of the predicted fuel economy and emissions of step 9.

FIG. 5 illustrates the results of step 8 in that a three-dimensional table of engine calibration control values has been generated. Table A is an example of the results of step 4 showing an optimal calibration for a particular driving cycle segment and the results of step 5 wherein energy density is calculated for the driving cycle segment. Four of the twenty-two points representing engine speed versus engine torque are shown. Table B illustrates the correlation of step 6. Similarly, Table C also illustrates the execution of step 6. Table D illustrates the results of step 8 and gives sample values for the tables which are illustrated in FIG. 5. Similarly, Tables E and F also give additional results of step 8 for different ones of the tables illustrated in FIG. 5.

C. Example of Table Generation

A powertrain simulation is used to generate an engine speed/load trajectory for particular vehicle characteristics and a given driving cycle. The individual speed/load data points are reduced in number by grouping into 22 speed/load points, and a dynamic programming routine is used to select percent of EGR and spark advance values (called "tags") for these points such that fuel use is minimized at selected feedgas emission levels.

Two adaptive program versions are used to simulate variations of the strategy described in later sections of this report. The first one splits the cycle into segments of the desired length (usually 45 seconds), groups and averages the past history of driving according to the user's estimator algorithm, and then performs dynamic programming to generate optimal calibrations, expected mileage and emissions. This process is repeated for each segment of the cycle.

The second program represents actual operation of the vehicle requiring the user to input the vehicle calibration tables and the estimator algorithm. The program executes in the same manner as the first program except that the actual vehicle tables are used to generate expected mileage and emissions rather than dynamic programming.

The simulation outputs can be translated into calibrations (or "tags") for different energy densities. By examining many different time distributions, in the speed/load plane, that can be associated with a given energy density, it can be determined if a set of preferred tags can be identified.

Numerous driving cycles (denoted Cycle 1, Cycle 2, Cycle 3, Cycle 4) were used to generate these time distributions. Also by using portions of these driving cycles a very large number of time distributions and calibrations could be generated.

The first step was to organize the spark advance and percent EGR selected by the optimization routine into a usable format. To accomplish this the selected engine operating conditions (spark advance and percent EGR) for each speed load point were listed in a table with their associated energy densities, emissions, and fuel flows (portions shown as Tables B and C). It is apparent from Table C for 72 ft-lbf at 1600 RPM that the choice of the preferred tag is not obvious. To improve drivability some judgment was involved in considering the conditions at adjacent load, speed and energy level and the percent of the total time for a given segment which was represented by that speed/load condition. The tables were constructed and the selections made for each speed/load point at hydrocarbon (HC) emission targets of 2.0 gm/mile, 2.5 gm/mile and 3.0 gm/mile (portions shown as Tables D, E and F). The selected tags were then evaluated using the computer simulations. The results (a calibration designated M20B in Table G) were then compared with the whole cycle optimized results.

Because the influence of each energy level is different for the various driving cycles, the changes to the calibrations were made in the following manner:

| Driving Cycle To Be Changed | Most Influential Energy Level In Horsepower — Hours Per Mile (HP — HRS/MI) |
|---|---|
| Cycle 1 | .9–1.0, 1.0–1.1 |
| Cycle 2 | <.7, .7–.8 |
| Cycle 3 | <.7, .7–.8 |
| Cycle 4 | .7–.8, .8–.9 |

For each driving cycle the dominant speed/load points were determined as:

| Driving Cycle | Dominant Load/Speed Points |
|---|---|
| Cycle 1 | 30/600, 5/800, 30,800, 71/1200, 96/1200 |
| Cycle 2 | 52/1600, 72/1600, 97/1600, 73/2000, 98/2000 |
| Cycle 3 | 72/1600, 53/2000, 73/2000, 98/2000 |
| Cycle 4 | 30/600, 5/800, 30/800, −18/1200, 71/1200, 96/1200 |

After evaluating a calibration designated M20B, it was found that for Cycle 2 the fuel economy and hydrocarbon (HC) emissions were considerably below whole cycle optimized values (22.42 versus 23.83 and 1.49 HC gm/mile versus 1.83 HC gm/mile), while NOx (oxides of nitrogen) was relatively close to the desired value, 1.71 gm/mile versus 1.83 NOx gm/mile (see Table G).

Examination shows:

1. For the 52 ft/lbf/1600 RPM point the same tag had been selected for both <0.7 and 0.7-0.8 and that this was the engine operating point with minimum fuel flow selected by dynamic programming (no change).

2. For the 72 ft-lbf/1600 RPM point the minimum fuel point has been chosen for energy density <0.7 but not for energy density 0.7-0.8. Further examination revealed that the use of the tag for the <0.7 point in place of the tag for the 0.7-0.8 point would reduce fuel flow, reduce NOx slightly, while increasing HC. These are advantageous changes.

3. For the 72/2000 RPM point a similar improvement could be made if the tags selected by dynamic programming for Cycle 3 were considered.

This process was completed by examining the remaining speed load points in all energy levels for all driving cycles. The new set of tags were then evaluated. The results are shown in Table G labeled as M20C.

This procedure was used to generate the calibrations for the 2.5 gm/mile and 3.0 gm/mile hydrocarbon levels shown in Tables E and F.

From Table D with spark and EGR tags listed for each energy level it can be seen that the value for level 1.1–1.2 and >1.2 are essentially identical; therefore, this can be considered as one level, >1.1.

The benefit of the adaptive strategy can be seen by comparing Tables H and I. These tables show the results of the whole cycle optimized program and the adaptive strategy simulation at a hydrocarbon feedgas level of 2.0 grams per mile. It is apparent that the adaptive strategy projections approach the whole cycle optimized results.

A comparison of the adaptive strategy simulation results with the results using the Cycle 1 calibration on all cycles shows a significant improvement in fuel economy on the highway (1.8 mpg on Cycle 2, 1.6 mpg on Cycle 3) at the hydrocarbon, HC, target of 2.0 gm/mile, for the adaptive strategy.

These calibrations can be implemented on a vehicle by inferring engine speed and torque from measurements of engine speed and manifold pressure. Values of spark and EGR can be generated by using linear interpolation at appropriate speed/load points.

The implementation of the adaptive strategy required the development of an estimator for instantaneous engine torque. For example, this expression can be evaluated every 25 msec. In an engine control system this value would be used to calculate engine energy output during a 45-second period. The engine energy is used in combination with the distance traveled to select the proper calibration. The need for high precision in these calculations can be reduced by adjusting the boundaries associated with each energy level to achieve the correct time distribution between calibrations for a given driving cycle.

The initial attempt was to calculate torque using an equation of the form:

$$Y = Ax + B \qquad (1)$$

Two quantities were considered for use as the independent variable "x". These were:
1. Mass air flow/intake stroke (MAFIS) computed determining the total gas flow (AMPEM) and subtracting EGR mass flow based on valve position.
2. Manifold absolute pressure (MAP) computed using the current MAP sensor value.

Evaluating the use of MAFIS or MAP as the independent variable it was concluded that there is no significant difference in the accuracy of equation (1) using MAFIS or MAP. However, the computation is much faster if MAP is used as the independent variable. The following equation can be used:

$$\text{Torque} = 9.75 \; \frac{\text{ft-lbf}}{\text{in Hg}} \; MAP \text{ (in Hg)} - 73 \text{ ft lbf}$$

After data correlating MAP and torque for the full range of engine speeds and spark advances was generated, it was found that a spark angle correction was needed. The following equations were used: Spark Advance Final (SAF)

SAF 30°
$$\text{Torque} = 9.9 \; \frac{\text{ft-lbf}}{\text{in Hg}} \; MAP - 69 \text{ (ft-lbf)}$$

SAF 30°
$$\text{Torque} = 9.9 \; \frac{\text{ft-lbf}}{\text{in Hg}} \; MAP - 69 \text{ (ft-lbf)}$$

$$= .6 \; \frac{\text{ft-lbf}}{\text{°BTDC}} \; (30 - SAF)$$

The value of instantaneous torque could then be used to compute the engine energy for a 45 second period.

$$E = \sum_{j=1}^{1758} 2\pi T_j \left(\frac{\text{ft-lbf}}{\text{rev}}\right) \left(N \frac{\text{rev}}{\text{jmin}}\right) \left(\frac{1 \text{ hp}}{33,000 \frac{\text{ft-lbf}}{\text{min}}}\right) \qquad (2)$$

$$(1 \; clkint) \left(25.6 \; \frac{\text{msec}}{clkint}\right) \left(\frac{1 \text{ hr}}{3.6 \times 10^6 \text{ ms}}\right)$$

$$E = \sum_{j=1}^{1758} (2\pi)(T_j)(N_j)(13.54 \times 10^{-10}) \text{ Hp} - \text{Hr}$$

The conventional engine control strategy is composed of an infinite program loop that is periodically interrupted for data acquisition and closed loop control functions. Within this loop, which can be referred to as the background logic, major system functions are:
1. System Initialization
2. Sensor Calibration
3. Strategy Mode Selection
4. Ignition Timing
5. Computation of Desired EGR Rate
6. Auxiliary Functions System initialization occurs upon key-ignition or processor restarts. It consists of setting the spark advance and EGR rate to default values until the proper control strategy has been selected. This section of the program also initializes read/write memory (RAM) and starts the analog to digital A/D conversion circuitry. Sensor calibrations are required to convert the raw data provided by the sensors to engineering units that are more suitable for engine control calculations. The strategy mode selection process identifies one of four mutually exclusive types of engine operation and selects the appropriate EGR/SPARK strategy. The four modes are:
1. Crank—engine speed less than 200 RPM.
2. Closed Throttle—throttle angle less than 6.9°
3. Part Throttle—throttle angle between 6.9° and 61°
4. Wide Open Throttle—throttle angle greater than 61°.

Part throttle is the only mode that is affected by the adaptive strategy because it requires a table of optimal EGR rates and spark advances similar to that shown in Table B. All of the other modes determine spark advance as a function of RPM or use the default timing of 10° before top dead center piston position (BTDC). The EGR rate can be set to zero for all modes except part throttle.

D. Adaptive Strategy Logic Using Predicted Energy Density Output

The adaptive strategy contributes toward providing the part throttle strategy with more optimal values of spark advance and EGR rates but to not affect other parts of the overall engine control strategy except for the additional amount of time (5–14 milliseconds) required to complete the main control loop. The basic processing requirements of the strategy are:
1. Measure or infer the distance traveled and energy consumed over consecutive 45 second intervals;
2. Maintain a time history of energies and distances;
3. Estimate the cycle energy density using the estimator algorithm and the recent driving history;
4. Select the appropriate EGR/SPARK tables for use during the next 45 second interval.

Figure 3:
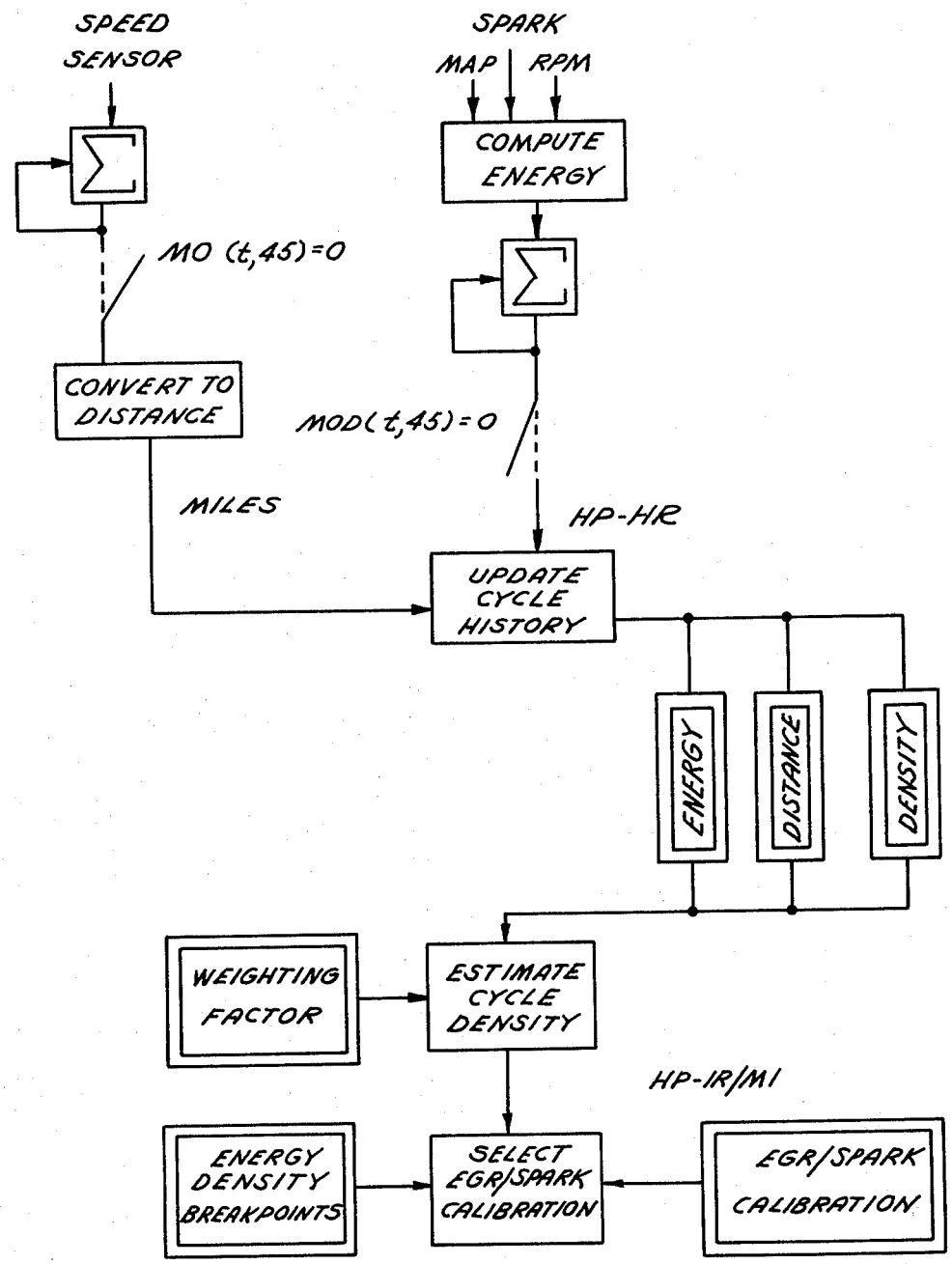
FIG. 3 is a logic block diagram illustrating calculation of the equations of FIG. 2.

FIG. 3 illustrates the interaction between the above program processes and the data structures that would constitute an adaptive calibration.

Figure 4:
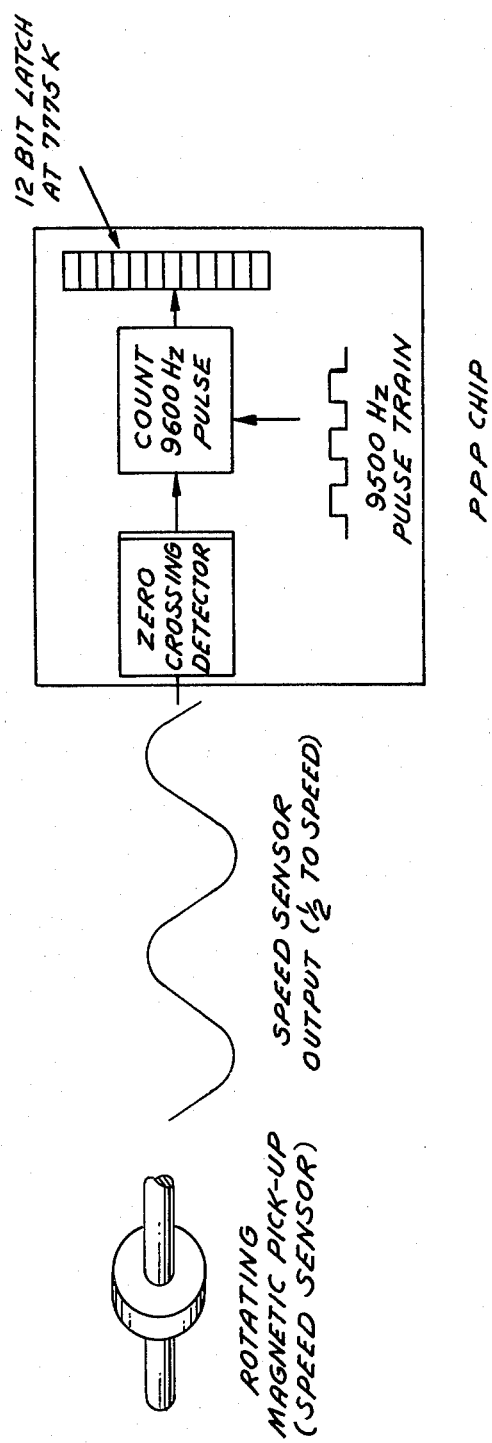
FIG. 4 is a block diagram illustrating generation of a speed signal for use as an input to the block diagram of FIG. 3.

The distance and energy measurements are performed at regular intervals. The road speed signal is a frequency which is proportional to the rotation rate of a speedometer cable. The distance is determined by summing the output of a road speed sensor that is read once every 0.0256 seconds. In order to get the speed sensor output into the computer an engine rotational position measuring device senses positive going zero crossings of the speed sensor's output signal (see FIG. 4). The frequency of the output signal is linearly proportional to the rotational speed of the speedometer cable. Sensor speed is measured by the number of 9600 Hz pulses that occur between zero crossings. This count is then output to a 12 bit digital latch. The measurement is calibrated to miles per hour by dividing the count into a conversion constant*.

$$VMPH = \frac{4363}{COUNTS}$$

*The total number (COUNTS) of 9600 Hz pulses is equal to the period of the sensor output frequency $$\left( = 2.2 \frac{cycles}{sec} \times V \frac{miles}{hr} \right)$$

divided by the period of a 9600 Hz pulse.

$$COUNTS = \frac{0.45 \sec \frac{(1) HR}{(V) MI}}{0.0001047 \text{ Sec}} = \frac{4363.2}{V \frac{HR}{mile}} \text{ and therefor,}$$

$$V \frac{(MI)}{(HR)} = \frac{4363}{COUNTS}$$

The total distance is calculated by summing each measurement taken during the 45 second interval and multiplying by the time interval that each measurement represents. That is, the measurement interval of 0.25625 seconds is divided by 3600 seconds per hour. For ease of implementation the total segment distance is computed as:

$$DIST = \frac{\sum_{i=1}^{1756} VMPH_i}{DSCON}$$

Where $VMPH_i$ is vehicle speed measured in $i^{th}$ measurement interval

DSCON is conversion CONSTANT FOR MILES=140625 1756 is total number of measurement intervals.

Energy is also computed at regular intervals according to equation 2. The total segment energy can be obtained by summing the result of each energy calculation performed during a 45 second period. Two 24 bit accumulators were maintained for negative and positive energies. At the end of a 45 second segment the net energy is computed as the difference between the contents of the two accumulators.

$$ENERGY = (13.54) \left( \sum_{i=1}^{1756} PE_i - \sum_{i=1}^{1756} NE_i \right)$$

13.54 Converts to horsepower hours HP-HR
PE—Positive Energy according to EQTN 2
NE—Negative Energy 1756—Total number of measurement intervals Recording the cycle history of vehicle distance, energy and density is accomplished by maintaining three circular buffers. Each buffer has the capacity to store the most recent 31 segments (equal to 22½ minutes) of data. The buffer contents are the primary source of data to the whole cycle energy density estimate. The use of an additional buffer for segment energy densities may appear redundant, in light of the fact that the parameters required to compute this value reside in the other two buffers, but the implementation of the weighting factor selection criteria was actually simplified by including the additional buffer.

After the segment energy distance, the density are stored into the appropriate buffer, analysis of the segment densities of the last three segments is performed in order to determine which set of weighting factors should be used in the whole cycle energy density estimate. The selection criteria for the weighting factors used in the following energy density prediction equation are summarized below:

Estimated Cycle Energy/Mile=A (45 sec.energy/mile)+B (6 min. energy/mile)+C (22 min. energy/mile)

Note: Assume that segment n below is the most recent completed segment, segment n-1 precedes n, and n-2 precedes n-1.

| Criterion | A | B | C |
|---|---|---|---|
| 1. Highly variable driving: Energy density (n-1) differs from energy density (n) by more than 25%. | 0 | 0 | 1 |
| 2. Consistent Driving: Energy density (n-1) differs from energy (n) by less than 25% AND (n-2) differs from (n-1) by more than 25%. | 0.5 | 0.5 | 0 |
| 3. Consistent Driving: Energy density (n-1) differs from energy density (n) by less than 25% AND (n-2) differs from (n-1) by less than 25%. | 0.4 | 0.6 | 0 |

Whole cycle energy density is calculated with these weighting factors according to $$EDNSTY = \frac{W_1 \sum_{j=i-l_1}^{i} E_j}{\sum_{j=i-l_1}^{i} D_j} + \frac{W_2 \sum_{k=i-l_2}^{i} E_k}{\sum_{k=i-l_2}^{i} D_k} + \frac{W_3 \sum_{m=i-l_3}^{i} E_m}{\sum_{m=i-l_3}^{i} D_m}$$

Wherein:
E is segment energy
D is segment distance
i is the current segment number
j is an index for the storage buffers
$l_1, l_2, l_3$ are maximum number of segments to sum A, B, C are weighting factors The whole cycle density estimate is compared against a table (see Table J) that contains energy density breakpoints versus spark/EGR table numbers. The numbers 0 through 5 indicate particular ones of the tables shown in FIG. 5. The result of the table look-up is used to select the appropriate SPARK/EGR Calibration table. After selection of the appropriate table, all of the energy density calculations are disabled until the next 45 second update. Selection of the proper spark/EGR calibration table independent of the actual engine control loop is advantageous because it reduces the time for performance of the engine control loop.

As expected, the adaptive strategy increases memory usage and program execution time. The decrease in speed is due primarily to the distance and energy calculations, which must be performed at the same rate as the air fuel (A/F) ratio control. These additional functions add approximately 1 millisecond to the total execution time for each measurement interval. There is no discernible effect on the operation of the ignition module. The whole cycle energy density estimates are computed once every 45 seconds during the background control loop. Approximately 9 milliseconds are required for the energy density calculations.

The objective of accurately determining the energy used and distance traveled each 45 second period is to provide information to select the appropriate engine calibration. Therefore, it is the calibration selected and not the actual energy or distance which is the ultimate concern.

As a first check, energy and distance data which was recorded during Cycle 1 and Cycle 2 is compared with the values calculated by the vehicle simulation in Tables K and L. While examining this data, it should be remembered that a given segment in the test does not contain the exact vehicle trajectory used in the simulation. This difference is due to the fact that the vehicle had to be started before the test equipment could be started and then finally the vehicle run was started. Energy values recorded during these tests are about 20% lower than the values from the simulation. Distances and energy densities are about 10% low (refer to Tables K and L).

As a second check of the vehicle steady state calculations, some steady state data was generated on the chassis dynamometer, Table M. This data indicates that the values calculated on the vehicle are 20 to 30 percent higher than would be expected.

The third and most important indication of whether the accuracy of the energy calculation is sufficient is the choice of the energy level in actual operation. Tables N and O represent the distribution of choices of energy level, both theoretical and actual, for two driving cycles, Cycle 1 and Cycle 2, and two prediction criteria 4 segment and 1, 8 and 30.

The use of the adaptive strategy demonstrated a fuel economy improvement of from 2.0 to 2.8 mpg on Cycle 2 and from 0.3 to 0.8 mpg on Cycle 1. Generally, current evidence indicates that 2.0 mpg on Cycle 2 and 0.3 mpg on Cycle 1 represent reasonable expectations.

Various modifications and variations will no doubt occur to those skilled in the various arts to which this invention pertains. For example, the particular number and length of driving cycle segments may be varied from that disclosed herein. Also, techniques such as exponential smoothing can be used to reduce the amount of random-access memory required. These and all other variations which basically rely on the teachings through which this disclosure has advanced the art are properly considered within the scope of this invention.

| NOTATIONS USED IN TABLES | |
| --- | --- |
| CALIB | Calibrated |
| HC | Hydrocarbon |
| CO | Carbon monoxide |
| NOx | Oxides of nitrogen |
| FE | Fuel economy |
| HP | Horsepower |
| HR | Hour |
| ft - lbf | Foot pounds |
| M20B; M20C | Levels of calibration development at 2 gm/mile HC |
| EGR | Exhaust gas recirculation |

TABLE A

Segment Number 9

| | | | | |
| --- | --- | --- | --- | --- |
| Torque/Speed (foot lbs/RPM) | 30/600 | 30/800 | −18/1200 | 96/1200 |
| Time Distribution (Secs) | 0.00 | 2.99 | 4.42 | 7.01 |
| Time Distribution (Percent) | 0.00 | 6.45 | 9.53 | 15.10 |
| Calib Time Distribution (Percent) | 8.99 | 19.91 | 2.95 | 13.18 |
| Calib Tag Numbers | 1 | 229 | 536 | 1257 |
| Energy Density (Percent) | 0.00 | 2.95 | 2.02 | 20.15 |

Segment Length = 0.4096 Miles
Segment Energy = 0.3016 Horsepower Hours
Total Elapsed Time = 405 Seconds
Total Distance = 2.393 Miles

| | HYDRO-CARBON Grams/Mile | CARBON MONOXIDE Grams/Mile | OXIDES OF NITROGEN Grams/Mile | FUEL ECONOMY Miles/Gallon |
| --- | --- | --- | --- | --- |
| Flow Rates In Segment | 1.739 | 11.624 | 1.859 | 20.841 |
| Flow Rates Over Cycle | 1.846 | 18.335 | 1.711 | 14.491 |

TABLE B

| Driving Cycle Segment | Tag No. (defines spark advance/EGR) | Energy Density (HP-HR/Mile) | EGR % | Spark (degrees of advance) | Grams/hour HC/CO/NOx/ | lbs/hour FE |
| --- | --- | --- | --- | --- | --- | --- |
| 5,14,17,18,26,27,29,30 | 803 | 1.34,1.19,1.25,1.20,1.08,1.05,1.12 | 0 | 0 | 28.7/342.2/41.1 | 10.4 |
| 16,19,28,31 | 804 | 1.16,1.20,1.31,1.47 | 4 | 0 | 29.1/415.6/28.1/ | 11.1 |
| 6,12 | 813 | 1.21,1.15 | 0 | 3 | 31.8,362.1/40.0/ | 9.7 |

Hydrocarbon Target - 2.0 Gm/Mile
Torque = 51 ft-lbf
Engine Speed = 1200 rpm

TABLE C

| Driving Cycle Segment | Tag No. (defines spark/advance/ EGR) | Energy Density (HP-HR/Mile) | EGR % | Spark (degrees of advance) | grams/hour HC/CO/NOx/ | lbs/hour FE |
|---|---|---|---|---|---|---|
| 7 | 1750 | 1.14 | 0 | 0 | 36.7/543.6/129.1 | 17.1 |
| 6 | 1753 | 1.22 | 12 | 0 | 40.9/634.2/40.4 | 20.3 |
| 1,4,5 | 1773 | .935,1.18,1.25 | 4 | 12 | 54.0/430.1/95.1 | 14.1 |

HC Target = 2.0 Gram/Mile
Torque = 72 ft-lbf
Engine Speed = 1600 rpm

TABLE D

| Tags for Load/Speed | <.7 | =.7 <.8 | =.8 <.9 | =.9 <1.0 | =1.0 <1.1 | =1.1 <1.2 | ≧1.2 |
|---|---|---|---|---|---|---|---|
| 30/600 | 49 | 49 | 1 | 1 | 1 | 2 | 3 |

HC = 2.0, CO = 20.0, NOx = 1.75

TABLE E

| Load/Speed | <.7 | =.7 <.8 | =.8 <.9 | =.9 <1.0 | =1.0 <1.1 | =1.1 <1.2 | ≦1.2 |
|---|---|---|---|---|---|---|---|
| 30/600 | 49 | 49 | 49 | 1 | 1 | 1 | 1 |
| 51/1200 | 932 | 932 | 932 | 853 | 853 | 833 | 803 |
| 72/1600 | 1889 | 1889 | 1889 | 1818 | 1818 | 1798 | 1752 |

HC = 2.50, CO = 20.0, NOx = 1.75

TABLE F

| Load/Speed | .7 | =.7 <.8 | =.8 <.9 | =.9 <1.0 | =1.0 <1.1 | =1.1 <1.2 | ≦1.2 |
|---|---|---|---|---|---|---|---|
| 30/600 | 49 | 49 | 49 | 49 | 49 | 1 | 1 |
| 51/1200 | 932 | 932 | 952 | 942 | 942 | 853 | 833 |
| 72/1600 | 1889 | 1889 | 1889 | 1839 | 1818 | 1818 | 1798 |

HC = 3.0, CO = 20.0, NOx = 1.75

TABLE G

| | CYCLE 1 | CYCLE 2 | CYCLE 3 | CYCLE 4 |
|---|---|---|---|---|
| M20B | | | | |
| HC | 1.99 | 1.49 | 1.62 | 1.70 |
| CO | 17.27 | 9.72 | 10.87 | 13.10 |
| NOx | 1.75 | 1.71 | 1.90 | 1.66 |
| FE | 14.77 | 22.42 | 20.81 | 18.73 |
| M20C | | | | |
| HC | 2.07 | 1.68 | 1.83 | 1.81 |
| CO | 15.51 | 9.16 | 10.21 | 12.79 |
| NOx | 1.75 | 1.64 | 1.71 | 1.65 |
| FE | 15.22 | 23.11 | 21.43 | 19.11 |
| Whole Cycle Optimized | | | | |
| HC | 1.99 | 1.83 | 1.99 | 1.99 |
| CO | 15.70 | 8.59 | 9.90 | |
| NOx | 1.75 | 1.75 | 1.75 | 1.75 |
| FE | 15.06 | 23.83 | 22.05 | 19.87 |

TABLE H

| Feedgas Target | Whole Cycle Optimized | | | | | CYCLE 1 Tags on Other Cycles | | |
|---|---|---|---|---|---|---|---|---|
| | CYCLE 1 | CYCLE 2 | CYCLE 3 | CYCLE 4 | | CYCLE 2 | CYCLE 3 | CYCLE 4 |
| 3.0/1.75 | 2.95 | 1.83 | 2.02 | 2.39 | HC | 1.68 | 1.74 | 2.22 |
| | | 8.59 | 9.72 | | CO | 9.16 | 10.59 | |
| 2.0/1.75 | 1.99 | 1.83 | 1.99 | | HC | 1.27 | 1.39 | 1.59 |
| | | 8.59 | 9.90 | | CO | 10.24 | 11.41 | |
| | 1.75 | 1.75 | 1.75 | 1.75 | NOx | 1.72 | 1.77 | 1.67 |
| | 15.06 | 23.83 | 22.05 | 19.87 | Fuel Econ. (miles, gallon) | | | |

HC/NOx (grams/Mile)

TABLE I

| Feedgas Target | CYCLE 1 | CYCLE 2 | CYCLE 3 | CYCLE 4 | |
|---|---|---|---|---|---|
| 2.0/1.75 | 2.07 | 1.68 | 1.96 | 1.81 | HC |
| | 15.51 | 9.16 | 10.21 | 12.79 | CO |
| | 1.75 | 1.64 | 1.71 | 1.65 | NOx |
| | 15.22 | 23.11 | 21.43 | 19.11 | Fuel Econ. (miles gal.) |

HC/NOx (grams/mile)

TABLE J

| Spark/EGR Calibration Table Numbers | Energy Density (HP-HR/MI) |
|---|---|
| 0 | 0.7031 |
| 1 | 0.7968 |
| 2 | 0.8906 |
| 3 | 1.0000 |
| 4 | 1.1093 |
| 5 | 1.2031 |

MINIMUM ENERGY DENSITY VS. CALIBRATION NUMBER

TABLE K

| | CYCLE 2 TEST | | | CYCLE 2 SIMULATION | | |
|---|---|---|---|---|---|---|
| Segment Number | Segment Energy HP-HR | Segment Distance Miles | Segment Energy Density | Segment Energy HP-HR | Segment Distance Miles | Segment Energy Density |
| 1 | .1035 | .0312 | 3.32 | .355 | .351 | 1.011 |
| 2 | .297 | .312 | .95 | .422 | .556 | .758 |
| 3 | .338 | .500 | .676 | .404 | .603 | .671 |
| 4 | .285 | .531 | .537 | .358 | .556 | .644 |

CYCLE 2 ENERGY DENSITIES

TABLE L

| | CYCLE 1 TEST | | | CYCLE 1 SIMULATION | | |
|---|---|---|---|---|---|---|
| Segment Number | Segment Energy HP-HR | Segment Distance Miles | Segment Energy Density | Segment Energy HP-HR | Segment Distance Miles | Segment Energy Density |
| 1 | .129 | .03125 | 4.13 | .198 | .119 | 1.67 |
| 2 | .197 | .219 | .849 | .249 | .307 | .812 |
| 3 | .180 | .312 | .576 | .167 | .248 | .677 |
| 4 | .094 | .031 | 3.00 | .218 | .099 | 2.187 |
| 5 | .395 | .281 | 1.41 | .576 | .490 | 1.177 |
| 6 | .461 | .594 | .78 | .476 | .683 | .697 |

CYCLE 1 ENERGY DENSITIES

TABLE M

| | Vehicle | | | Calculated | |
|---|---|---|---|---|---|
| Speed | Energy | Distance | E/D | Energy | Distance |
| 30 mph | .150 | .349 | .44 | .099 | .38 |
| 40 mph | .213 | .438 | .49 | .161 | .500 |
| 50 mph | .352 | .562 | .63 | .250 | .625 |

STEADY STATE VALUES

TABLE N

Selected Calibration Distribution For CYCLE 2

| Energy Density Level | <.7 | .7–.8 | .8–.9 | .9–1.0 | 1.0–1 | >1.1 |
|---|---|---|---|---|---|---|
| Simulation using energy density prediction | 0 | 9 | 4 | 4 | 0 | 0 |
| Test using energy #1 density prediction | 11 | 3 | 2 | 1 | 0 | 1 |
| #2 | 3 | 6 | 4 | 1 | 1 | 1 |
| #3 | 6 | 10 | 2 | 0 | 0 | 0 |
| #4 | 2 | 8 | 3 | 4 | 0 | 0 |
| #5 | 3 | 6 | 6 | 1 | 0 | 0 |
| #6 | 2 | 6 | 8 | 1 | 0 | 0 |
| Average | 4.5 | 6.5 | 4.27 | 1.33 | .17 | .33 |
| Combined Average for <.7 same as .7–.8 and 1.0–1.1 same as >1.1 | 11 | 4.17 | 1.33 | .5 | | |

TABLE O

Selected Calibration Distribution For CYCLE 1

| Energy Density Level | <.7 | .7–.8 | .8–.9 | .9–1.0 | 1.0–1 | >1 |
|---|---|---|---|---|---|---|
| Simulation using energy density prediction | 0 | 2 | 1 | 26 | 2 | 0 |
| Test using energy density prediction | 1 | 2 | 9 | 11 | 6 | 3 |
| | 2 | 4 | 6 | 14 | 5 | 1 |
| | 2 | 1 | 7 | 14 | 7 | 0 |
| | 0 | 4 | 7 | 10 | 7 | 2 |
| Average | 1.25 | 2.75 | 7.25 | 12.25 | 6.25 | 1.3 |
| Combined Average for <.7 same as .7–.8 and 1.0–1.1 same as >1.1 | 4 | 7.25 | | 12.25 | 7.25 | |

What is claimed is:

1. A method for generating a table of spark advance and percent EGR for use by an adaptive vehicle control system having a target emission value, said method comprising:
   generating a plurality of vehicle driving cycle segments relating vehicle speed with time;
   associating vehicle speed versus time coordinates of a vehicle driving cycle segment with corresponding points of a discrete engine matrix of engine load versus engine speed thus describing engine operation during a driving cycle segment;
   determining for each vehicle driving cycle, at each point of the discrete engine matrix, an optimal calibration of engine control variables including percent EGR and spark advance so that fuel economy is maximized at the selected target emission value;
   calculating for each vehicle driving segment one energy density representative of energy usage divided by distance traveled during the vehicle driving segment;
   correlating each point on the discrete engine matrix of a driving cycle segment with the energy density of the driving cycle segment; and
   eliminating all but one when there is a plurality of the optimal calibrations of engine control variables associated with a point of a discrete engine matrix as a result of having a plurality of vehicle driving cycle segments to obtain a suggested tag group of engine control variables to be used with the associated energy density thereby defining each suggested tag group of engine control variables as a point on a three dimensional matrix having axes of energy, engine torque and engine speed.

2. A method for generating a table as recited in claim 1 further comprising the step of:
   comparing the magnitudes of engine control variables associated with adjacent points on the discrete engine matrix; and
   adjusting the magnitudes of the engine control variables if the magnitudes are not sufficiently close together to permit desirable drivability characteristics of the vehicle engine.

3. A method for generating a table as recited in claim 1 further comprising:
   simulating vehicle operation with an engine having a table of engine control variables as developed in Claim 1;
   generating a predicted energy density for use with the table of engine control variables;
   calculating a predicted fuel economy and emissions level;
   comparing the predicted fuel economy and emission level to a desired fuel economy and emission level; and
   adjusting the magnitudes of the engine control variables to minimize the differences between the predicted and desired fuel economy and emission level.

4. A method for generating a table as recited in claim 3 wherein the step of generating a plurality of vehicle driving cycle segments includes:
   generating a plurality of driving cycles representing at least typical urban, suburban and highway driving patterns;
   splitting each driving cycle into a plurality of driving cycle segments of approximately 45 seconds each;

calculating the engine speed and engine torque at about 1 second intervals during each driving cycle segment;

reducing the number of engine speed and torque points to facilitate calculation; and the number of driving cycles being sufficient so that at each point of the discrete engine matrix more than one calibration of engine control variables is generated, selection of the optimal calibration being based on the associated energy density.

5. A method for generating a table as recited in claim 3 wherein the step of generating a plurality of vehicle driving cycle segments includes:

generating a plurality of driving cycles representing typical urban, suburban and highway driving patterns and the driving cycles being sufficient in number so that at each point of the discrete engine matrix more than one optimal calibration of engine control variables is generated;

splitting each driving cycle into segments; and calculating the engine speed and torque at a plurality of periodic intervals during each driving cycle segment.

6. A method for generating a table as recited in claim 5 wherein said step of generating a plurality of vehicle driving cycles includes generating a sufficient number and diversity of driving cycle segments so that the energy densities corresponding to the driving cycles have at least one entry in each of the following energy density ranges:

>0.7
>0.7 and ≦0.8
>0.8 and ≦0.9
>0.9 and ≦1.0
>1.0 and ≦1.1
>1.1 and ≦1.2
>1.2 wherein the unit for the energy density are HP-hours/mile.

7. A method for generating a table as recited in claim 7 wherein said step of determining the engine operating characteristics includes:

calculating the energy density from the engine energy output during a driving cycle, velocity parameters, and time parameters; and applying a desired torque and RPM to the engine and then evaluating the corresponding percent EGR, spark advance and emission levels.

8. A method for generating a table as recited in claim 7 wherein the step of associating vehicle speed versus time coordinates of a driving cycle segment with corresponding points of a discrete engine matrix includes:

simulating the characteristic of a vehicle powertrain coupled to the vehicle engine, the powertrain characteristics including the vehicle characteristic of weight, transmission characteristics and road load; and the step of determining engine characteristics includes using dynamic programming.

9. A method for generating a table as recited in claim 3 wherein the step of generating a predicted energy density includes the step of:

solving the following equation with the weighting factors A, B, and C as defined below:

Estimated Cycle Energy/Mile = A (45 sec.energy/mile) + B (6 min.energy/mile) + C (22 min. energy/mile)

Note: Assume that segment n below is the most recent completed segment, segment n-1 precedes n, and n-2 precedes n-1;

| Criterion | A | B | C |
|---|---|---|---|
| 1. Highly variable driving: Energy density (n-1) differs from energy density (n) by more than 25%. | 0 | 0 | 1 |
| 2. Consistent Driving: Energy density (n-1) differs from energy (n) by less than 25% AND (n-2) differs from (n-1) by more than 25%. | 0.5 | 0.5 | 0 |
| 3. Consistent Driving: Energy density (n-1) differs from energy density (n) by less than 25% AND (n-2) differs from (n-1) by less than 25%. | 0.4 | 0.6 | 0 |

10. A method for generating a table of spark advance and percent EGR for use by an adaptive control system for a vehicle engine having a target emission value, said method comprising:

generating a sufficiently large number of driving cycle segments relating vehicle speed with time, each driving cycle segment being approximately 45 seconds in duration, so that at each point in a control parameter matrix there is at least one entry (tag) representing engine calibration control values including spark advance and percent EGR, the control parameter matrix being defined by a first axis representing energy density in a plurality of ranges and a second axis representing a plurality of different combinations of engine load and engine speed; and optimizing the engine calibration control values at the points on the control parameter matrix having more than one set of engine calibration control values so as to maximize fuel economy while maintaining emissions below the target value.

11. A method of generating control values for controlling the performance of a spark ignited automobile internal combustion engine at a desired target value for emissions by translating simulation outputs (including torque/speed, time distance) into calibrations for different densities of energy consumed by the engine, said method including the steps of:

establishing an association between energy densities and a representation in an engine speed versus load plane, defined by axes of engine speed and load, of a plurality of automobile velocities as a function of time;

establishing for each speed load point an association between operating conditions (spark advance and EGR) and energy densities, emissions and fuel economy; and reducing fuel consumption while maintaining the desired target value for emissions.

12. A method of generating look-up tables of value of engine control variables for controlling the performance of a spark ignited automobile internal combustion engine in accordance with a desired value for emissions including the steps of:

developing an optimized first set of calibration values for a first driving cycle segment relating velocity and time, the first set of calibration values being a function of engine torque, RPM and an associated first energy density;

developing an optimized second set of calibration values for a second driving cycle segment relating velocity and time, the second set of calibration values being a function of engine torque, RPM and an associated second energy density; and selecting between calibration values of the first set and calibration values of the second set at any point of engine torque, RPM and energy density where the calibration values of the first and second sets are different, said selecting between the first and second sets including selecting operating conditions which maximize fuel economy at the desired target value for emissions.

* * * * *